United States Patent Office

3,320,038
Patented May 16, 1967

3,320,038
SINTERED TANTALUM CARBIDE BODIES
Siegfried Scholz and Bernd Lersmacher, Aachen, Germany, assignors to North American Philips Company, Inc., New York, N.Y., a corporation of Delaware
No Drawing. Filed Oct. 26, 1964, Ser. No. 406,595
Claims priority, application Germany, Aug. 10, 1960, N 18,757
2 Claims. (Cl. 29—182.7)

This application is a continuation-in-part of application Serial No. 127,321, filed July 27, 1961, now abandoned.

Our invention relates to sintered carbide bodies and a method of making the same, particularly bodies sintered under pressure consisting essentially of tantalum carbide and mixtures of tantalum carbide and carbides of titanium, zirconium and hafnium and an auxiliary sintering accelerator material in an amount less than 3% by weight of the carbide.

Because of their high melting point and good electrical conductivity, as well as extreme hardness and resistance to chemical action, carbide bodies of the above type are very important technically. However, it is particularly difficult to manufacture such bodies from pure powdered carbides, whereas making them by melting and casting is impractical because of the high melting points. If such bodies are made by sintering without applying pressure they will generally have a density which is too low for many purposes. While bodies with a minimum number of pores may be produced satisfactorily from pure powdery carbides by sintering with the simultaneous application of heat and pressure, this has the disadvantage that the extremely high temperatures and pressures required complicate and increase the cost of manufacture.

To accelerate the sintering process it is known to add to the carbides one or more metals from the iron group, i.e. iron, cobalt and nickel, in an amount of about 1% by weight of the carbides. However, this has the disadvantage of promoting the grain growth in such a way that pores are enclosed within the grains during the sintering process, which can be eliminated only very slowly from the bodies during the sintering process.

We have found quite surprisingly that the above disadvantages are overcome by employing as the auxiliary material, manganese either alone or mixed or alloyed with iron, which material is present in an amount of about 0.02% to 3% by weight of the carbide, the manganese in a mixture with iron or in an alloy with iron being preferably present in an amount between about 0.01% and 1.5% by weight of the carbide. When using such auxiliary materials there is less carbide grain growth and the bodies have a higher density than when using the metals Fe, Co and Ni alone.

In order that the invention may be clearly understood and readily carried into effect and the advantages thereof over the prior art clearly pointed out, we will describe the same in more detail with reference to the accompanying drawing in which the single figure is a perspective view of a sintered carbide body according to the invention.

The body shown in the drawing consists of a sintered mixture of at least one carbide of tantalum, or a mixture of this carbide with at least one carbide of a metal selected from the group consisting of titanium, zirconium and hafnium, and an auxiliary material consisting of manganese, either alone or mixed or alloyed with iron. The auxiliary material is present in an amount between about 0.02% to about 3% by weight of the carbides and the manganese is preferably present in the mixture or in the alloy in an amount greater than about 0.01% and less than about 3%, preferably less than about 1% by weight of the carbides.

In order to obtain the most advantageous density the sintering conditions i.e. temperature and pressure must, of course, be adapted to various condition, such as the size of the particles and the composition of the particular carbide or mixed carbides used. However, one skilled in this art will have no difficulty in selecting those conditions which produce the most desirable density.

The following examples are illustrative of our invention:

*Example I*

To tantalum carbide powder having an average grain size of about 5 to 6$\mu$ we added about 0.5% by weight of manganese powder in an amount of about 0.5% by weight of the carbide powder and with a grain size as small as possible, for example less than about 37$\mu$ after which the two powders were thoroughly mixed. The mixed powder was then pressed in a carbon mould having a die made of TaC provided with a thin layer of carbon on the pressing surface. Seven bodies were pressed from this mixture using a pressure of about four hundred to five hundred kg./cm.$^2$ and a temperature of about 2000° C. These bodies had an average density of about 14.15 g./cm.$^2$ and an average relative density of about 97.7%.

*Example II*

An auxiliary material consisting of 1% by weight of ferromanganese (about 50/50) was used in the method described in Example I and an average relative density of about 98.1% was attained.

*Example III*

If, instead of using pure tantalum carbide as in Example I, use is made of a mixture of about 20 mol. percent of ZrC and 80 mol. percent of TaC in accordance with the method described in Example I an average relative density of about 99.0% is attained.

*Example IV*

HfC, instead of ZrC, was used in the method described in Example III and bodies with an average relative density of about 98% were obtained.

The advantages of using manganese, either alone or mixed or alloyed with iron is shown in Table 1 below in which the relative densities relate to X-ray densities and hence to the ideal monocrystal. While the example shown are carbides of tantalum, zirconium and hafnium and tungsten, similar results were obtained when using the carbide of titanium. It should also be noted that when the theoretical density is approached further by only 1% the remaining pores will be reduced by as much as 25% to 50%.

TABLE 1

| Carbide | Auxiliary material, percent by weight of carbides | | | | Pressure (49/cm.²) | Pressing Temperature (° C.) | Density | Percent of theoretical density (D) | Porosity (100−D) percent | Remarks |
|---|---|---|---|---|---|---|---|---|---|---|
| | Co | Fe | Ni | Mn | | | | | | |
| TaC | 0.5 | | | | 300 | 2,000 | 13.87 | 95.6 | 4.4 | Theoretical Density, 14.5 gr./cm.³ |
| | 1.0 | | | | 300 | 1,800 | 13.88 | 95.6 | 4.4 | |
| | | 1.0 | | | 300 | 1,800 | 13.75 | 95.0 | 5.0 | |
| | | | 1.0 | | 300 | 1,800 | 13.93 | 96.3 | 3.7 | |
| | | | | 1.0 | 300 | 1,500 | 14.11 | 97.4 | 2.6 | |
| | | | | 1.0 | 300 | 1,800 | 14.10 | 97.3 | 2.7 | |
| | | | | 1.0 | 300 | 2,200 | 14.06 | 97.0 | 3.0 | |
| | | | | 0.5 | 400 | 2,000 | 14.20 | 98.0 | 2.0 | |
| | | 0.5 | | 0.5 | 300 | 1,900 | 14.15 | 97.6 | 2.4 | Ferromanganese. |
| TaC/ZrC | | | 1.0 | | 300 | 2,300 | 11.05 | 86.5 | 13.5 | 80:29 Mol. Percent Theoretical Density, TaC/ZrC, 12.8 gr./cm.³ |
| | | | | 1.0 | 300 | 2,100 | 12.60 | 98.5 | 1.5 | |
| | | | | 1.0 | 300 | 2,300 | 12.55 | 97.7 | 2.3 | |
| TaC/HfC | 1.0 | | | | 300 | 2,000 | 13.30 | 94.0 | 6.0 | 80:20 Mol. Percent Theoretical Density, TaC/HfC, 14.1 gr./cm.³ |
| | | 1.0 | | | 300 | 2,000 | 13.0 | 92.0 | 8.0 | |
| | | | 1.0 | | 300 | 1,700 | 13.33 | 94.5 | 5.5 | |
| | | | | 1.0 | 300 | 1,700 | 13.66 | 97.2 | 2.8 | |
| | | 1.0 | | | 300 | 2,500 | 13.45 | 95.5 | 4.5 | |
| | | | | 1.0 | 300 | 2,500 | 13.74 | 97.5 | 2.5 | |

From an inspection of the data given in Table 1 it is seen that when using not more than 1% by weight of manganese with respect to the weight of the carbides, one obtains a noticeable improvement in the density and porosity without any appreciable increase in the sintering pressure and temperature.

Because of the use of manganese there will be a smaller degree of grain growth and this results in an increase in the mechanical rigidity, a higher density and a smaller grain size. This is shown in Table 2 below in which a comparison is made of the grain size and bending strength between bodies made with tantalum carbide and Mn or FeMn as auxiliary materials and bodies sintered in the same manner as the first bodies, but in which only iron, nickel or cobalt is employed as the auxiliary material. The bodies for which data is given in Table 2 were made from a powdery mixture of TaC and auxiliary material in the amount of 1% by weight of a carbide which mixture was sintered for about 60 minutes at a temperature of about 1800° C. and at a pressure of about 300 kg./cm.².

TABLE 2

| Auxiliary Material | Relative Density (Percent of Theoretic density) | Average Grain Size ($\mu$) | Bending Strength (kg./mm.³) |
|---|---|---|---|
| Co | 95.6 | 37.7 | 6.7 |
| Ni | 96.3 | 35.4 | 9.6 |
| Fe | 95.0 | 21.0 | 38 |
| Mn | 97.3 | 15.8 | 38 |
| FeMn (50/50) | 97.6 | 18.5 | 32 |

The bending strength is measured by determining the force necessary to break a body having a width of 1.5 mm. and a thickness of 2.5 mm., the force being applied in three-point loading arrangement with a distance of about 7 mm. between the points at which the body is supported.

From Table 2 it is noted that when iron only is used as an auxiliary material a high bending strength is obtained, but in this case the density is very poor. In working with carbide bodies a fact known from ceramic technique, i.e. that the rigidity increases with an increase in grain size, is confirmed.

Because of the competition between grain growth and the disappearance of the pores, there are optimum temperature regions at which the carbides may be sintered under pressure to obtain bodies having a greater density than those obtained when sintered at the same pressure, but at temperatures outside this region. When higher pressures are used these optimum regions are shifted to lower temperature ranges. Values of these optimum temperature regions are shown below in Table 3 for several specific carbides.

TABLE 3

| Carbide | Auxiliary Material, Percent | Pressure (kg./cm.²) | Sintering time (mins.) | Optimum Temp. region, ° C. |
|---|---|---|---|---|
| TaC | Mn 1.0 | 300 | 60 | 1,500–2,200 |
| | 0.3 | 300 | 60 | 1,600–1,800 |
| TaC/ZrC 80/20 | 1.0 | 300 | 60 | 1,700–2,300 |

While we have described our invention in connection with specific examples and specific procedures we do not desire to be limited thereto as obvious modifications will readily present themselves to one skilled in this art.

The term "carbide body sintered under pressure" as used in the claims, is to be understood to mean a body of carbide particles secured together by being sintered under high pressure.

What is claimed is:

1. A carbide body sintered under pressure and consisting essentially of tantalum carbide and from about 0.01 to 1% by weight of an auxiliary sintering-accelerator material selected from the group consisting of manganese and a mixture, in approximately equal weights, of manganese and iron.

2. A carbide body sintered under pressure and consisting essentially of tantalum carbide in a major amount, a carbide selected from the group consisting of titanium carbide, zirconium carbide and hafnium carbide in a minor amount and from about 0.1 to 1% by weight of an auxiliary sintering-accelerator material selected from the group consisting of manganese and a mixture, in approximately equal weights, of manganese and iron.

References Cited by the Examiner

UNITED STATES PATENTS 1,999,888  4/1935  Ammann _____ 29—182.8 X
2,167,516  7/1939  Kelley _____ 29—182.7
2,971,839  2/1961  Nussbaum _____ 75—203

FOREIGN PATENTS 465,323  5/1937  Great Britain.
669,588  4/1952  Great Britain.
732,440  6/1955  Great Britain.

CARL D. QUARFORTH, *Primary Examiner.*

BENJAMIN R. PADGETT, *Examiner.*

A. J. STEINER, *Assistant Examiner.*